Jan. 24, 1956   R. E. FLEMING   2,731,948
WORK PIECE HOLDER
Filed June 20, 1952   2 Sheets-Sheet 1
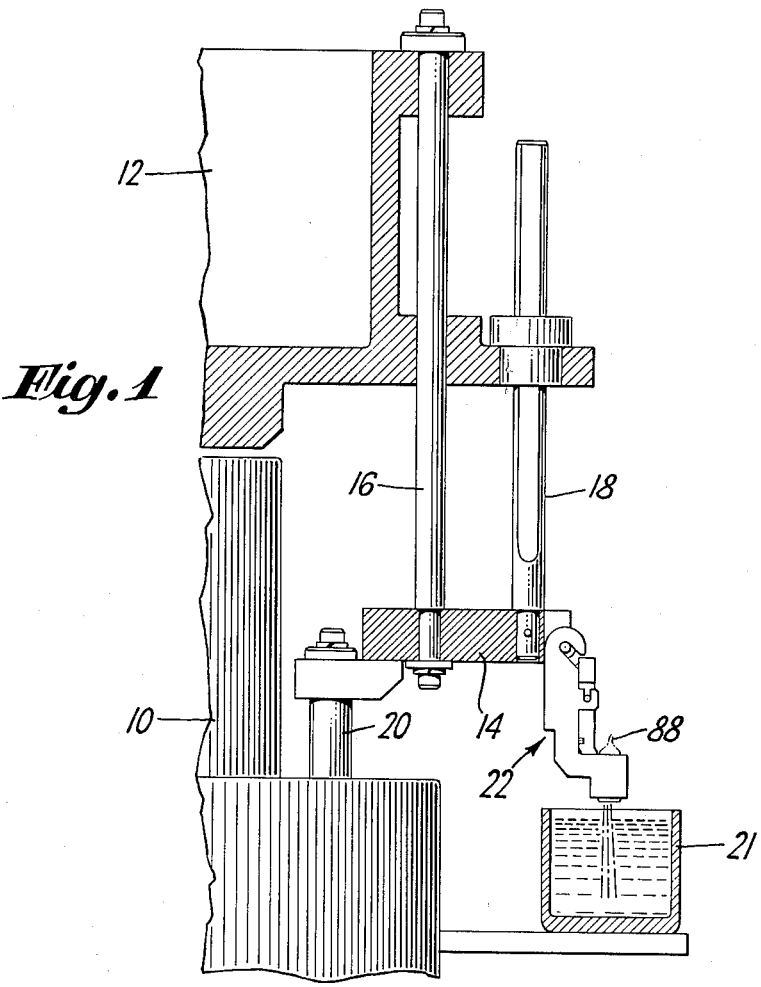
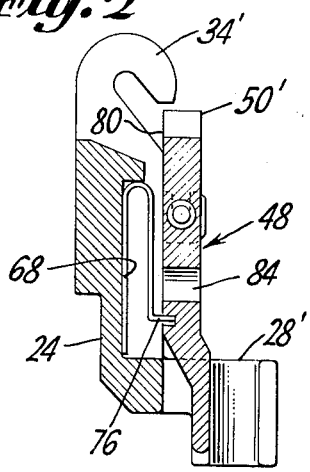
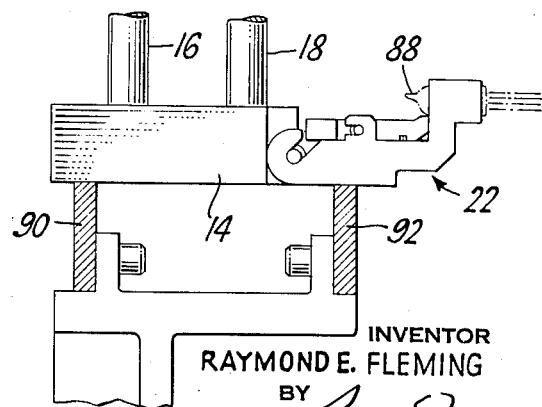
INVENTOR
RAYMOND E. FLEMING
BY
*Paul S. Martin*
ATTORNEY Jan. 24, 1956  R. E. FLEMING  2,731,948
WORK PIECE HOLDER Filed June 20, 1952  2 Sheets-Sheet 2

INVENTOR
RAYMOND E. FLEMING
BY
*Paul S. Martin*
ATTORNEY

United States Patent Office 2,731,948
Patented Jan. 24, 1956

2,731,948

WORK PIECE HOLDER

Raymond E. Fleming, Philadelphia, Pa., assignor to Sylvania Electric Products Inc., a corporation of Massachusetts Application June 20, 1952, Serial No. 294,737

14 Claims. (Cl. 118—503)

This invention relates to article supports, and more particularly to an electron tube holder of screwless construction which can be readily dismantled and assembled.

Article holders are useful in a variety of mechanisms where it is necessary to handle articles in their passage through progressive treatment stages. The holder disclosed herein is particularly useful in machines for tinning the leads of vacuum tubes. In such machines, the holders usually are mounted on movable supports and carry the vacuum tubes through processing stages including dipping in an acid cleaning bath, subsequent dipping in a solder or tinning bath, and final dipping in a wash bath. During the various dipping stages, the holders as well as their supports are exposed to the cumulative effects of the various baths, often resulting in destructive corrosion. Additionally, when screws are employed in assembling the components of the holders and in mounting the holders on the supports, the corrosive attack frequently freezes the screws in place rendering it difficult or impossible to dismantle the holders for inspection and replacement or repair of defective components. The deleterious effects of corrosion can be overcome by constructing all of the components exposed to the effects of the various baths of a non-corrosive material, such as stainless steel. However, this would necessitate the formation of the assembly screws from a screw material characteristically hard to machine, resulting in substantial increases in production costs.

Accordingly, it is the object of the present invention to provide a novel article holder which obviates at least some of the foregoing difficulties.

It is another object of the present invention to provide a tube holder relatively immune to attack by reagents likely to cause corrosion or oxidation.

A further object of the present invention is the provision of a non-corrosive tube holder which may be readily dismantled for inspection, and the repair or replacement of components.

A still further object of the present invention is the provision of a tube holder including a number of separable components which may be easily assembled without screws or the like, and dismantled with equal facility.

A still further object of the present invention is the provision of a screwless and separable tube holder which, when assembled, cannot be accidentally or inadvertently dismantled, yet can readily be "knocked down" intentionally.

A still further object of the present invention is the provision of an article holder of the aforesaid character which may be removably mounted on a support for movement relative thereto, the mounting being accomplished in a manner precluding removal of the holder from the support until such time as the holder is at least partially dismantled.

The above and still further objects and advantages of the present invention will become apparent upon consideration of the following detailed description of an illustrative embodiment of the present invention, when taken in conjunction with the accompanying drawing, wherein:

Fig. 1 is an elevational view of a screwless article holder constructed in accordance with the principles of the present invention and shown, for the purpose of illustration, in combination with a lead tinning machine at a dipping station thereof;

Fig. 2 is a vertical sectional view of portions of the article holder of Fig. 1;

Fig. 3 is an elevational view of the article holder shown in a horizontal or article receiving position and at the loading station of the lead tinning machine of Fig. 1.

Figure 4:
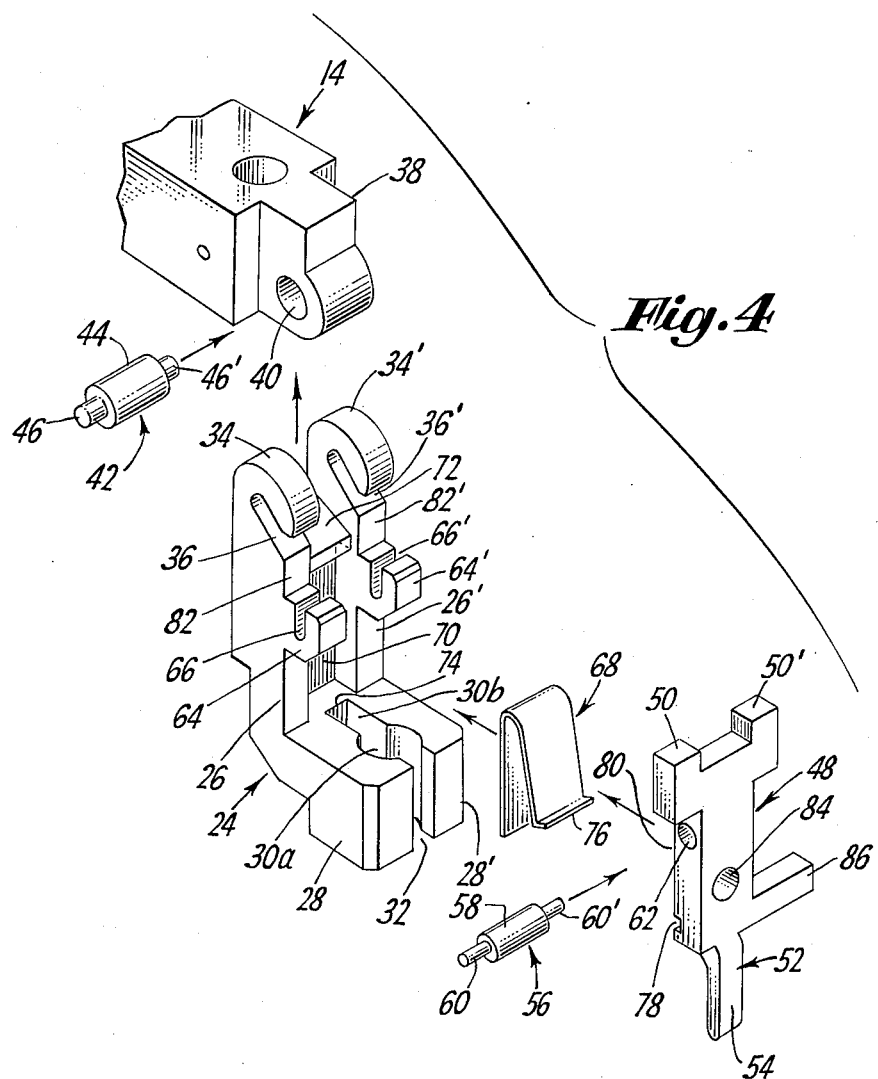
Fig. 4 is an enlarged, exploded perspective view of the article holder.

Referring now to the drawings, there is shown in Fig. 1 a lead tinning machine advantageously incorporating the article holders of the present invention. The details of the construction and operation of the illustrated machine are completely disclosed in my copending application Serial No. 329,034, now Patent Number 2,723,922.

Briefly, the lead tinning machine includes a base 10 which supports a main carrier or turret 12 intermittently indexed by a Geneva drive, not shown. Arranged at spaced locations about the periphery of the main turret 12, are the holder mounting heads or supports 14. These supports are individually mounted for vertical movement by the parallel guide rods 16, 18 which are slidably supported in suitable bearings provided in the main turret 12. The base 10 further supports a vertically reciprocating operating member 20 arranged to raise and lower the holder mounting head 14 relative to a treating tank 21 in accordance with the principles and practices described in the aforesaid patent, and subsequently outlined herein.

For the purpose of illustration, an article holder constructed in accordance with the principles of the present invention and generally designated by the reference numeral 22, has been shown mounted on the vertically movable support 14. However, it is to be understood that the article holder, which is preferably fabricated of a non-corrosive material such as stainless steel, is useful in many other applications and may be mounted, for example, on a stationary support.

Referring now specifically to Figs. 2 to 4, the article or tube holder 22 is seen to include an integral holder body 24 of symmetrical construction with respect to its vertical center plane. The holder body 24 is formed with opposed side portions 26, 26' carrying depending fixed jaws 28, 28' cooperating to define an article-receiving chamber 30 accessible at one side through a slot 32. The chamber 30 is subdivided into a compartment 30a of circular cross-section and another compartment 30b of rectangular cross-section opening into the compartment 30a on the side opposite the slot 32. In order to removably mount the holder body 24 on the support 14, side portions 26, 26' are formed with upwardly projecting hanger arms or hooks 34, 34' provided with downwardly opening, inclined bearing slots or seats 36, 36', while bearing member 38 of the support 14 is formed with a bore 40. The holder body 24 is swingably suspended by a holder mounting pin 42 which includes a body portion 44 within bore 40 and reduced stub shafts 46, 46' in the inclined bearing slots 36, 36'.

Extending longitudinally of the holder body 24, is a combined latch and jaw member 48 which is swingably mounted relative to the body 24 and is movable into an operative position, as illustrated in Figs. 1 to 3. In this operative position, the latch member prevents detachment of the holder body 24 from the support 14 and additionally cooperates with the body 24 for gripping an article received within the compartment 30a of the chamber 30. Specifically, the latch and jaw member 48 includes a pair of upwardly projecting lugs 50, 50' arranged to obstruct the lower open ends of the bearing slots 36, 36' of the hanger arms 34, 34' to prevent the accidental removal of the reduced stub shafts 46, 46' of the mounting pin 42 from the slots 36, 36'. Further, the latch member 48 embodies an integral downwardly extending article engaging jaw 51 receivable via slot 32 within the compartment 30b and having an abutment face 54 forming a continuation of the circular bounding wall of the compartment 30a when engaging an article in that compartment.

The latch member 48 is swingably positioned by means of a latch mounting pin 56 having a body portion 58 journaled in the latch member 48 and reduced stub shafts 60, 60' journaled on the holder body 24. Specifically, the latch member 48 is provided with a transverse bore 62 to receive the body portion 58 of the pin 56, while the holder body 24 is formed with integral projections 64, 64' extending from the side portions 26, 26' and having opposed upright bearing slots or seats 66, 66' for rotatably holding the stub shafts 60, 60' of the latch mounting pin 56.

A multiple purpose spring 68 is operatively connected to the latch member 48 for biasing the latch and jaw member into the operative position (in which jaw 52 engages an article and lugs 50, 50' obstruct slots 36, 36') and for additionally preventing detachament of the latch member 48 from the holder 24. As shown in Figs. 2 and 4, the holder body 24 is formed with a rectangular compartment 70 having an open front which receives the spring 68, illustrated as an inverted U-shape strap of resilient material. The side walls of the compartment 70 are defined by the side portions 26, 26' of the holder body, while the upper and lower walls are formed by the integral cross pieces 72, 74 of the holder body 24. The length and width of the compartment 70 are proportioned to prevent longitudinal and transverse displacement of the spring 68 when placed therein.

The spring 68 is formed with a transverse flange 76 adjacent the free end of one leg thereof which is receivable within a complementary notch 78 formed across the inner face 80 of the latch member 48. When the flange 76 is engaged within the notch 78, the stub shafts or reduced ends 60, 60' of the latch mounting pin 56 cannot be removed from the respective seats 66, 66'. Further, the latch member 48 is biased into the operative position, illustrated in Fig. 2 wherein the depending jaw 54 cooperates with the opposed jaws 28, 28' for gripping an article therebetween. Excessive counterclockwise movement of member 48 is precluded by engagement of the inner face 80 of the latch member 48 with the stop surfaces 82, 82' formed on the holder body 24 between the extension 64, 64' and the hanger arms 34, 34'. Spring 68 interlocks with members 24 and 48 by engagement with recesses 70 and 78 therein.

In order to release the spring 68 from engagement with slot 78 when the holder is to be dismantled, the latch member 48 is provided with an opening 84. Any suitable tool may be inserted through the opening 84 to depress the adjacent leg of the spring 68.

Projecting laterally of latch member 48 is an operating element 86 which may be manually or mechanically engaged in order to effect a limited rotation of the latch member 48 out of the operative position of Fig. 2 for releasing an article, such as the tube 88 (Fig. 1) gripped between the cooperating jaws 28, 28' and face 54.

The complete assembly of the components of the article holder can be effected in a simple and expeditious manner and is preferably accomplished as follows:

Referring specifically to Fig. 4, the holder mounting pin 42 is inserted within the bore 40. The hanger arms 34, 34' are then hooked over the reduced ends or stub shafts 46, 46' of the holder mounting pin 42. The latch mounting pin 56 is next inserted within the bore 62 and ther inverted U-shape spring 68 placed within the compartment 70. Thereafter the reduced ends of the latch mounting pin 56 are brought into the opposed and aligned bearing seats 66, 66'. As the latch mounting pin 56 is seated, the spring flange 76 enters the notch 78. When thus assembled the upwardly projecting lugs 50, 50' of latch member 48 constrict the open ends of the bearing seats 36, 36' to prevent the removal of the holder body from the support 14. The spring 68 prevents the removal of the latch mounting pin from the seats 66, 66', and also biases the jaw 52 into the operative position relative to the jaws 28, 28' to cooperate therewith in the support of articles, such as a tube 88. Pins 42 and 56 are prevented from endwise removal, by engagement of their large central portions with the constricted seats 36, 36' and 66, 66'.

When the respective holders are to be dismantled for inspection, repair, or replacement, the following procedure is preferably followed:

A suitable tool is inserted in the opening 84 of the latch member 48 to disengage the gripping finger 76 of the spring 68 from the notch 78 to permit the latch mounting pin 56 to be slid upward across the front ends of hooks 34, 34', and to be lifted from the opposed seats 66, 66'. The compartment 30b of the chamber 30 provides sufficient clearance for the depending jaw 52 that is swung clockwise in this operation. Thereafter it is merely necessary to lift the holder body 24 to disengage the hanger arms 34, 34' from the holder mounting pin 42. In substantially the aforesaid manner the components of the article holder can be "knocked down" for the purpose of inspection, replacement or repair.

When the holder 22 is incorporated in the lead tinning machine of Fig. 1 it is utilized substantially as follows:

At the loading station, the tube holder 22 is brought into a substantially horizontal loading position, illustrated in Fig. 3, by means of the inner and outer rails 90, 92 of the machine base 10. At the tinning station the support 14, which is being maintained in the uppermost position of its reciprocating movement by the operating member 20 engaging the support 14, is thereafter lowered by the operating member into the treating tank 21 containing a tinning material in accordance with the principles and practices outlined in detail in the aforesaid patent. Finally, member 86 is pressed to push jaw 52 deep into compartment 30b while the holder is disposed vertically when it is desired to unload and drop the tube from the holder, when the holder is over a washing tank.

From the foregoing, it is apparent that the holders constructed according to the present invention may be advantageously employed in lead tinning machines and are relatively immune to attack by corrosive reagents, yet the holder is formed of parts readily fabricated even of materials that are difficult to machine. Additionally, the holders can be readily assembled and dismantled.

The foregoing represents an effective embodiment disclosed in relation to a machine wherein it is especially useful; but other applications as well as variations in matters of detail will occur to those skilled in the art. Accordingly, the appended claims should be accorded such broad interpretation as is consistent with the spirit and scope of the invention.

What I claim is:

1. In an article holder including a support member, a body member, and a combined latch and jaw member, first cooperating means on said support and body members detachably mounting said body member on said support member, second cooperating means on said body and latch members detachably mounting said latch member on said body member, said latch and jaw member having an operative position relative to said body member for preventing detachment of said body member from said support member and for gripping an article, and resilient means biasing said latch and jaw member into said operative position and preventing unintentional detachment of said latch and jaw member from said body member.

2. In an article holder including a support member and a body member having an article receiver, first pin and seat means having a mounting pin on one of said members, and a seat on the other of said members for removably receiving said mounting pin and mounting said body member on said support member, a latch member having an article engaging jaw cooperating with said article receiver in said body member for holding an article, second pin and seat means on said body and latch member for removably mounting said latch member on said body member, said latch member having an operative position for preventing unintentional disengagement of said first pin and seat means, and resilient means operatively connected to said latch member and biasing said latch member into said operative position.

3. In a screwless article holder including a support member, a body member having and article receiver, and a latch member, pin and seat means on said support and body members detachably mounting said body member on said support member for rocking movement relative thereto, second seat means on said body and latch members detachably mounting said latch member on said body member for rocking movement relative thereto, said latch member having a select position in its rocking movement for preventing detachment of said body member from said support member and for gripping an article in the article receiver, and resilient means operatively connected to said latch member and holding said latch member in said select position.

4. A "knock down" assembly for forming an article holder comprising a support member, a body member having an article-receiver, cooperating pin and seat means on said support and body members detachably mounting said body member on said support member for movement relative thereto, a latch member including an article-engaging jaw operatively arranged relative to said article-receiver for supporting an article, second cooperating pin and seat means on said body and latch members detachably mounting said latch member on said body member for movement relative thereto and having an operative position for preventing unintentional detachment of said body member from said support member, and a spring biasing said latch member into said operative position and preventing detachment of said latch member from said body member.

5. An article holder comprising a support member, a body member including opposed jaws forming an article-receiving chamber, cooperating hook and pin means on said support and body members detachably mounting said body member on said support member for pivotal movement relative thereto, a latch member including an article-engaging jaw extending into said chamber and cooperating with said opposed jaws to support an article therebetween, second cooperating hook and pin means on said body and latch members detachably mounting said latch member on said body member for pivotal movement relative thereto, lug means on said latch member operative in a select position of said latch member to prevent detachment of said body member from said support member, and resilient means operatively connected to said latch member for holding said latch member in said select position.

6. An article holder according to claim 5, wherein said resilient means include a spring interposed between and interlocked with said body member and said latch member and operative to prevent longitudinal displacement of said latch member relative to said body member.

7. In an article holder having a support member, a body member having an article receiver, and a latch member, said support and body members having first cooperating pin and seat means detachably mounting said body member on said support member and permitting hinged motion, said first seat means including passage space for radial withdrawal of said first pin means, second cooperating pin and seat means on said body and latch members detachably mounting said latch member on said body member for hinged, lever-like motion, said second seat means including passage space for radial withdrawal of said second pin means, said latch member having an article contacting surface at one end cooperating with the article receiver, and a passage closing portion at the other end, and resilient means operatively connected to said latch member and urging said second pin means into engagement with said seat means on said body and latch members, said resilient means also urging said passage closing portion of said latch member across said passage space for said first pin and seat means.

8. An article holder having a support member, a body member having an article receiver and hingedly connected to said support member by first pin and seat means, a latch member hingedly connected to said body member by second pin and seat means, each of said seat means providing passage for radial removal of said pin means, said latch means having a stop portion and an article gripping portion, and a spring between said latch and said body, said spring urging said latch member stop portion over the passage of said first pin and seat means while urging said gripping portion into engagement with an article in said receiver, and said spring urging said second pin means into said second seat means.

9. An article holder having a support member, a first mounting pin on said support member, a body member including opposed jaws forming an article-receiving chamber, said body member having downwardly opening seats for removably and pivotably engaging said first mounting pin and said body member having upwardly opening seats for removably receiving a second mounting pin, a latch member having an article engaging jaw cooperating with said opposed jaws for gripping an article placed within said article-receiving chamber and having a second mounting pin pivotally received in said upwardly opening seats, said latch member having an operative position for constricting said downwardly opening seats to prevent unintentional removal of said first mounting pin therefrom, and a spring carried by said body member and engaging said latch member for biasing said latch member into said operative position, said spring having interlocking engagement with said latch member for maintaining said latch member against upward displacement relative to said body member whereby unintentional removal of said second mounting pin from said upwardly opening seats is prevented.

10. An article holder having: a support, a body member and a latch and jaw member; said body member having means for engaging the support, seating means for pivotally mounting said latch and jaw member, and article receiving means; said latch and jaw member having latch means for preventing disengagement of said body member from said support and having jaw means cooperating with said article receiving means for grasping an article.

11. An article holder: having a support, a body member, a latch and jaw member, and an interlock member; said body member having means for engaging the support, seating means for pivotally mounting said latch and jaw member, and article receiving means, said latch and jaw member having latch means for preventing disengagement of said body member from said support and having jaw means cooperating with said article receiving means for grasping an article; and said interlock member having means for biasing said latch and jaw member into latching and article grasping condition and means for preventing unseating of said latch and jaw member from said body member.

12. An article holder having: a support, a body member and a latch and jaw member; said body member having recessed means for engaging the support, seating means for pivotally mounting said latch and jaw member, and article receiving means; said latch and jaw member having a portion for preventing disengagement of said recessed means from said support and having jaw means cooperating with said article receiving means for grasping an article.

13. An article holder having: a body member, a latch and jaw member, and an interlock member; said body member having recessed means for engaging a support, seating means for pivotably mounting said latch and jaw member on said body, and article receiving means; said latch and jaw member having a portion for preventing disengagement of said recessed means from said support and having jaw means cooperating with said article receiving means for grasping an article; and said interlock member having means for biasing said latch and jaw member into latching and article grasping condition and means for preventing unseating of said latch and jaw member from said body member.

14. An article holder having: an elongated body member, an elongated latch and jaw member, and an interlock member; said body member having means for pivotally receiving said latch and jaw member, a support, means for receiving the support, and means for receiving an article, said means for receiving said latch and jaw member being centrally disposed on said body and said support receiving means and said article receiving means disposed on either side of said means for receiving said latch and jaw member; said latch and jaw member having centrally disposed means for pivotally engaging said body member and having means for preventing disengagement of said support receiving means and jaw means for cooperating with said article receiving means disposed on either side of said pivot means; and said interlock member including means for biasing said latch and jaw member into latching and article grasping condition and means for preventing unseating of said latch and jaw member from said body.

References Cited in the file of this patent

UNITED STATES PATENTS

| | | |
|---|---|---|
| 267,457 | Richardson | Nov. 14, 1882 |
| 673,797 | Johnston | May 7, 1901 |
| 737,353 | Cornelius et al. | Aug. 25, 1903 |
| 785,195 | Busch | Mar. 21, 1905 |
| 1,354,930 | Williams | Oct. 5, 1920 |
| 1,476,817 | Hatfield | Dec. 11, 1923 |
| 2,178,525 | Taylor | Oct. 31, 1939 |
| 2,417,472 | Dorff | Mar. 18, 1947 |
| 2,619,936 | Kaneski | Dec. 2, 1952 |